M. M. MANVILLE & C. A. BISSETT.
Hose-Couplings.
No. 198,643. Patented Dec. 25, 1877.
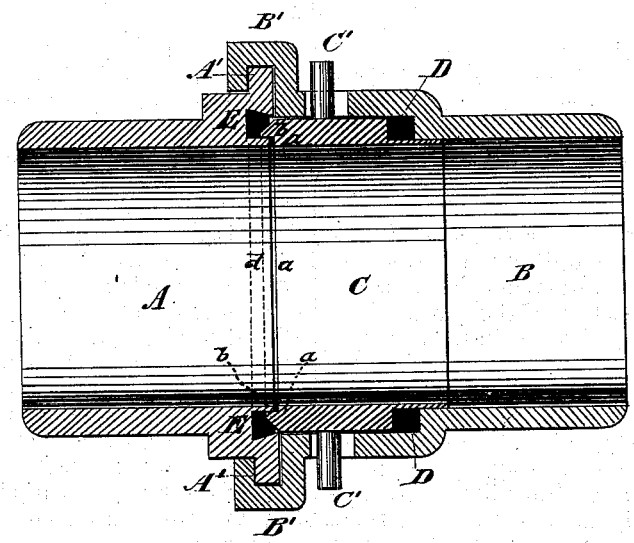
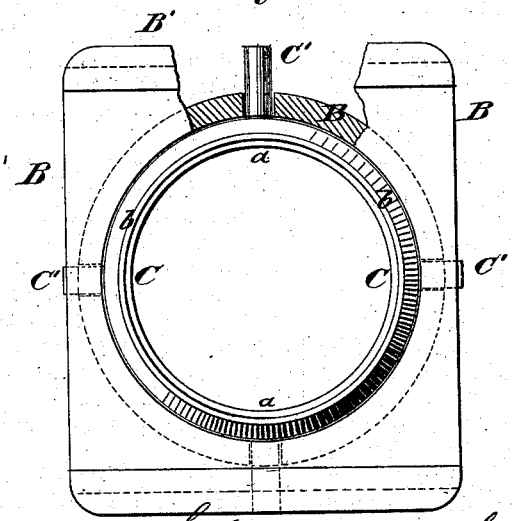

20# UNITED STATES PATENT OFFICE.

MARCUS M. MANVILLE AND CHARLES A. BISSETT, OF WHITEHALL, N. Y.

IMPROVEMENT IN HOSE-COUPLINGS.

Specification forming part of Letters Patent No. 198,643, dated December 25, 1877; application filed August 3, 1877.

*To all whom it may concern:*

Be it known that we, MARCUS M. MANVILLE and CHARLES A. BISSETT, of Whitehall, in the county of Washington and State of New York, have invented a new and Improved Hose-Coupling, of which the following is a specification:

In the accompanying drawings, Figure 1 represents a vertical longitudinal section of our improved hose-coupling, and Fig. 2 an end view of the female portion of the same.

Similar letters of reference indicate corresponding parts.

This invention relates to an improved hose-coupling that may be speedily connected, as there are no screw-threads used, by a sliding motion merely, and which may be connected as well with pressure on the hose as not, effecting thereby a considerable saving of time, especially when an extra length of hose is needed.

The hose may be coupled on the ground without raising the same and interrupting the flow of water.

The invention consists of a female portion having guideways, and an interior and spring-acted collar, that forms a tight joint with the male portion of the coupling, that is moved along the guides, and tightly seated by a rubber ring or packing against the tapering edge of the collar.

In the drawing, A represents the male, and B the female, portion of our improved hose-coupling, which, in contradistinction to the screw-jointed hose-couplings, is made without a screw-thread, and connected or separated by a transverse slide-motion. The female portion is for this purpose provided with lateral face guides or ways B', along which the square face part of the male portion slides. The female portion B is further provided with an interior sliding collar, C, that is intended to produce the tight joint between the male and female part A B, and to keep them also fastened together. The collar C is seated along an inner annular recess of the female portion B and backed by a rubber ring or packing, D interposed between a shoulder of the female portion B and a shoulder of the collar C. The rubber ring D serves as a spring to the sliding collar, and also as a water-tight packing with the female portion. The front edge of the collar C is made with a shoulder, $a$, and with a tapering or triangular edge, $b$, that presses against a rubber packing-ring, E, seated into an annular recess of the male portion, the shoulder $a$ bearing against the ring $d$ of the male portion, and the edge pressing into the rubber ring E, and forming a water-tight joint therewith. The pins C' of the sliding collar C pass through slots of the female portion B, and serve to draw the collar back for admitting of the ready uncoupling of the male portion by being pulled sidewise in the guides of the female portion.

By sliding the male portion into the female portion not only a water-tight joint is obtained, but also, by the binding action of the jointing-collar, the reliable coupling of the parts is obtained in a quick and handy manner.

Having thus described our invention, we claim as new and desire to secure by Letters Patent—

1. A hose-coupling composed of a male portion sliding on transverse face guides or ways of the female portion, and being connected by an interior sliding and cushioned collar, substantially as and for the purposes specified.

2. The combination of the female portion B, having face guides or ways B', and sliding and cushioned interior collar C, having end shoulder $a$ and tapering edge $b$, with the transversely-sliding male portion A, having annular groove and packing E, substantially as specified.

MARCUS MURRAY MANVILLE.
CHARLES ALEXANDER BISSETT.

Witnesses:
JOHN DONAGHY,
R. J. SAXE.